UNITED STATES PATENT OFFICE.

WILLIAM M. HENDERSON, OF MORTON, PENNSYLVANIA.

PROCESS OF PRESERVING BEER.

SPECIFICATION forming part of Letters Patent No. 308,965, dated December 9, 1884.

Application filed July 15, 1884. (No specimens.)

*To all whom it may concern:*

Be it known that I, WILLIAM M. HENDERSON, a citizen of the United States, residing at Morton, in the county of Delaware and State of Pennsylvania, have invented a new and useful Improvement in Preserving Beer, Cider, and other Fermented Liquors and Extracts liable to Acid Fermentation; and I do hereby declare that the following is a full, clear, and exact description of the same, which will enable others skilled in the art to which it appertains to make and use the same.

This invention is intended, particularly, to apply to the preservation of lager-beer, and more particularly to that intended for exportation. The export trade of the United States in lager-beer to warmer southern climates is already quite extensive, and would be vastly increased were it not for the fact that it is difficult to make beer which will not spoil by the influence of climatic changes, experienced when taken from the cool atmosphere of a brewery, placed in the hold of a ship, and landed, say, at any of the tropical ports of the West India islands or continent of South America. I have tasted lager-beer imported from the United States and from Europe in many of these localities—Havana, Porto Rico, St. Thomas, La Guayra, Rio de Janeiro, Peru, Guayaquil, Vera Cruz, and on the Isthmus of Panama. Besides the extravagant price demanded, (about thirty cents per so-called pint bottle,) the beer was quite unpalatable and unfit to drink. Beer for exportation has to be specially prepared, customarily by standing the filled bottles in water heated by steam to a temperature varying from about 120° to 140° Fahrenheit. The effect of this treatment, while it certainly places the beer in a condition to withstand the effects of the climatic changes incidental to exportation without souring, produces another effect of a very objectionable nature. It destroys the bouquet completely, and gives the beer a peculiarly disagreeable taste, depriving it altogether of relish. This unpleasant taste in the beer is caused by the presence of the dead organic matter held in suspension cooked in the process of steaming.

The chemistry of the matter teaches as follows: In the beer as originally made some remnant of yeast remains. Yeast is composed of minute granules of a vegeto-animal substance endowed with life, deriving its nourishment from the fermenting material part of the beer, and increasing at the expense of the substance fermented. These living organisms are then the real cause of the acid fermentation complained of when beer sours. The living organism or active agent, here known as "saccharomycetes," it has been ascertained, is destroyed at a temperature of from 120° to 140° Fahrenheit, after which fermentation can no longer take place unless living ferments are again introduced. In this connection the time of exposure to a given temperature is quite as important as the temperature itself. A lower temperature continued for a longer time may be more effective than a higher temperature maintained for a shorter interval, as a degree of heat which will kill the mature organized ferment may not, if relinquished too soon, kill the germs, from which succeeding generations of active saccharomycetes may again be produced.

The object of this invention is to carry out the necessity demanded by the chemistry governing the preservation of beer and other substances liable to acid fermentation, by destroying the vitality of the organic matter, the cause of the same, as previously stated, by an entirely different treatment, which shall not entail upon the beverage treated the objectionable flavor assimilating to that of boiled beer, and that clouded appearance, with accompanying sediment, incidental to beer which has been steamed sufficiently to kill the living organisms and germs of the same, to which end, after bottling or otherwise inclosing the beer in the containing envelopes, I subject the same to such a degree of cold that the living organisms and the germs of the same shall be killed by freezing instead of by heating. The degree of intensity of cold just necessary for this purpose I have not definitely ascertained; but when the beer is frozen solid in the bottles and not afterward exposed to the air the result is gained, as I have determined by actual experiment. Beer so treated, after being kept six months in a close heated room, and subsequently exposed for five days to the sun's rays in the month of July, (1884,) was found upon test to be clear and sparkling, retaining its original bouquet.

To freeze the beer or otherwise to lower the temperature to the degree necessary to produce the specified result, the beer may be placed in the freezing or refrigerating chamber of any ice or artificial-cold making machine, such as are now made and used in breweries and buildings erected in warm climates for the production of artificial ice. Care must be taken, if the bottles are corked previous to exposure to the cold, to leave a space about one-eleventh of the bulk of the liquid at the top, to allow for that expansion of bulk which invariably occurs in the act of congelation; or the bottles may be corked after freezing, leaving the same space above. Subsequently the beer should be kept in a cool atmosphere, to gradually liquefy, during which time and afterward it must be hermetically sealed by perfect corking from contact with the air, the admittance of any particle of which would spoil the contents.

In practice I find that the usual space left between the cork and the top of the fluid—about one and one-half to two inches of the neck of the bottle—is sufficient for the expansion of freezing, and as I have ascertained by repeated experiment that there is no danger of the bottles bursting, as might be apprehended, the preferred method is to cork the bottles tight previous to the cold exposure.

I am aware that it is customary in breweries to lower the temperature of the beer after brewing by cooling apparatus, passing the same through a system of pipes and allowing water to trickle down from above over the cooling-tubes, and that it has been proposed to cool it as low as 32° Fahrenheit, for the purpose of charging the same with carbonic-acid gas, and for the purpose of separating by filtration the albumen and other impurities held in suspension, described in the English Patent No. 1,025 of 1879, and in the English provisional specification No. 4,910 of 1879, all of which I lay no claim to, as being foreign to my invention, the nature of which may be more clearly defined by stating that, as in the case of steaming the beer, the time of exposure to the low temperature necessary to destroy the life of the living organisms and the microscopic germs of the same is quite as important as the temperature itself, in which connection it must be noted that merely reducing the temperature to 32° Fahrenheit does not imply that freezing occurs. Time and a further extraction of heat are required for this purpose.

To reduce the beer from the ordinary temperature of 62° to 32° Fahrenheit simply requires the removal of thirty units of heat; but to change the physical state of the liquid at 32° to the solid form at the same temperature requires the further extraction of one hundred and forty-two heat-units.

In the process of solidifying we have an extension of time and an extraction of heat about four and one-half times as great as was required in the first reduction from 62° to 32°. With the liquid we are necessarily restricted in fall of temperature to 32°, while with the solid form there is no limit except as to the cold-producing capabilities of the refrigerating apparatus employed in the process. It is this extension of time and further reduction of heat, the inverse of the action of the latent heat of liquefaction, that kill the living ferments and the germs of the same.

I am also aware that in Russia, it is alleged, brandy is sometimes frozen in bottles to obtain a strong alcoholic stimulant, and that beer has been alleged to have been frozen in Germany for the like purpose of procuring a concentrated beer more alcoholic than it was before treatment. Such a process, however, would have no commercial value, owing to its wasteful character, the larger part of the liquid being rejected in the form of ice. I lay no claim to such partial freezing, especially as the resultant fluid is exposed to atmospheric influence which would be fatal to my purpose, as I have discovered by experiment. I allowed some beer which had been frozen in bottles to liquefy exposed to the air. The result was that the flavor was completely lost, and the beer became insipid to the taste, void of all palatableness, and totally unfit to drink. I also froze some of the beer with the cork out, but sealed it before permitting liquefaction, without apparent deterioration.

It is evident that the temperature necessary to solidify beer and other substances liable to acid fermentation will vary directly with the proportion of alcohol contained. As fermentation is arrested, however, by the presence of about twenty per cent. of alcohol, substances containing this amount and over would be free from fermentation and would not require treatment; but it must be remembered that in the process of freezing the more aqueous part is attacked first, the alcohol, retreating to the center, becoming more concentrated as the weaker parts are separated by freezing. It may therefore be a physical impossibility to freeze a liquid containing alcohol absolutely solid, as pure alcohol has never been frozen. The term "solid," as herein used, is subject to this reservation. As proof-spirits freeze at 7° Fahrenheit, this may be the necessary limit for all practical requirements of this improvement. My experiments, however, have all been conducted at about the zero-point of Fahrenheit's thermometer, which I have found to be eminently satisfactory with lager-beer containing about four per cent. of alcohol. The means I employed to produce this temperature was by the use of broken ice and rock-salt used in a large ice-cream freezer in which the bottles of beer were immersed. With this apparatus I found that about two hours' exposure to the temperature induced was sufficient to freeze the contents solid. The bottles were then removed to a cool place to gradually liquefy, as before described.

It is evident that while for the purpose of experiment the means just described are in every way effective, in practice, to meet the requirements of the production of a brewery, an ice-producing machine of adequate capacity would be required.

I do not claim that the causes here given for the deterioration of beer are the true exponent of the phenomenon of acid fermentation, as the present state of our knowledge of the subject may not be conclusive; but What I desire to claim and secure by Letters Patent is—

The process of preserving beer or its described equivalents, which consists in inclosing the same in a receptacle capable of being made air-tight, cooling the same till it attains a solid condition, and maintaining it in such condition, in the manner described, sealing the vessel, so as to prevent the ingress of air, and allowing the contents to gradually liquefy, substantially in the manner and for the purpose herein set forth.

WILLIAM M. HENDERSON.

Witnesses:
A. A. BENKERT,
W. L. VOELKER.